United States Patent
Lee et al.

(10) Patent No.: US 12,069,011 B2
(45) Date of Patent: Aug. 20, 2024

(54) ELECTRONIC DEVICE AND METHOD FOR CONTROLLING ELECTRONIC DEVICE

(71) Applicant: SAMSUNG ELECTRONICS CO., LTD., Suwon-si (KR)

(72) Inventors: Jiyeon Lee, Suwon-si (KR); Hoyoung Kim, Suwon-si (KR); Jaehyung An, Suwon-si (KR); Dongil Yang, Suwon-si (KR); Cheolseung Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 197 days.

(21) Appl. No.: 17/503,819

(22) Filed: Oct. 18, 2021

(65) Prior Publication Data

US 2022/0094651 A1    Mar. 24, 2022

Related U.S. Application Data

(63) Continuation of application No. PCT/KR2021/012059, filed on Sep. 6, 2021.

(30) Foreign Application Priority Data

Sep. 21, 2020 (KR) .................. 10-2020-0121778

(51) Int. Cl.
*H04L 51/04* (2022.01)
*G06F 40/20* (2020.01)
*G06F 40/30* (2020.01)

(52) U.S. Cl.
CPC .............. *H04L 51/04* (2013.01); *G06F 40/20* (2020.01); *G06F 40/30* (2020.01)

(58) Field of Classification Search
CPC ........... H04L 51/04; G06F 40/20; G06F 40/30
See application file for complete search history.

(56) References Cited

U.S. PATENT DOCUMENTS 10,234,951 B2   3/2019   Park
10,671,682 B2   6/2020   Danyluk et al.
(Continued)

FOREIGN PATENT DOCUMENTS

JP   2020-004410   1/2020
KR   10-1584225    1/2016
(Continued)

OTHER PUBLICATIONS

International Search Report and Written Opinion dated Dec. 21, 2021 in corresponding International Application No. PCT/KR2021/012059.

*Primary Examiner* — Hua Fan
(74) *Attorney, Agent, or Firm* — Nixon & Vanderhye P.C.

(57) ABSTRACT

An electronic device and a method for controlling thereof are provided. The electronic device may include: a memory and a processor configured to: input sentences input into a plurality of conversation rooms generated through a messenger application into a first model and acquire characteristic information of conversations conducted in the plurality of respective conversation rooms, based on a first sentence being input, input the first sentence and the characteristic information into a second model and acquire first scores indicating a similarity between the first sentence and the characteristics of the conversations conducted in the plurality of respective conversation rooms, input the first sentence and the sentences input into the plurality of conversation rooms into a third model and acquire second scores indicating relevance between the first sentence and the sentences input into the plurality of conversation rooms, identify a conversation room as a conversation room corresponding to the first sentence among the plurality of conversation rooms based on the characteristic information, the first scores, and (Continued)

the second scores, and input the first sentence into the identified conversation room.

4 Claims, 10 Drawing Sheets

(56) References Cited

U.S. PATENT DOCUMENTS

| | | | |
|---|---|---|---|
| 10,991,368 B2 | 4/2021 | Lee et al. | |
| 2013/0263013 A1 | 10/2013 | Jiang | |
| 2018/0367325 A1 | 12/2018 | Jang | |
| 2019/0327195 A1 | 10/2019 | Lim | |
| 2019/0392826 A1* | 12/2019 | Lee | G06V 20/59 |
| 2020/0036831 A1* | 1/2020 | Kim | H04L 67/306 |

FOREIGN PATENT DOCUMENTS

| | | |
|---|---|---|
| KR | 10-2016-0029045 | 3/2016 |
| KR | 10-1614287 | 4/2016 |
| KR | 10-1911180 | 10/2018 |
| KR | 10-2018-0124433 | 11/2018 |
| KR | 10-2020-0000604 | 1/2020 |
| KR | 10-2020-0011123 | 2/2020 |
| KR | 10-2020-0020192 | 2/2020 |

* cited by examiner

FIG. 3B 50-1

|  | FORMALITY (THIRD SCORE) | | | TOPIC (FOURTH SCORE) | | |
|---|---|---|---|---|---|---|
|  | FIRST CONVERSATION | SECOND CONVERSATION | THIRD CONVERSATION | FIRST CONVERSATION | SECOND CONVERSATION | THIRD CONVERSATION |
| FIRST CONVERSATION ROOM | 2 | 1 | 5 | TRAVEL : 9<br>EVERYDAY LIFE : 7<br>POLITICS : 1 | TRAVEL : 2<br>EVERYDAY LIFE : 7<br>POLITICS : 0 | TRAVEL : 6<br>EVERYDAY LIFE : 7<br>POLITICS : 0 |
| SECOND CONVERSATION ROOM | 9 | 9 | 7 | TRAVEL : 0<br>EVERYDAY LIFE : 1<br>POLITICS : 7 | TRAVEL : 0<br>EVERYDAY LIFE : 3<br>POLITICS : 2 | TRAVEL : 0<br>EVERYDAY LIFE : 4<br>POLITICS : 3 |
| ... | ... | ... | ... | ... | ... | ... |
| NTH CONVERSATION ROOM | 3 | 5 | 4 | TRAVEL : 0<br>EVERYDAY LIFE : 1<br>POLITICS : 7 | TRAVEL : 0<br>EVERYDAY LIFE : 3<br>POLITICS : 3 | TRAVEL : 0<br>EVERYDAY LIFE : 2<br>POLITICS : 3 |

50-2

|  | WEIGHT RELATED TO FORMALITY | WEIGHT RELATED TO TOPIC |
|---|---|---|
| WEIGHT CORRESPONDING TO THE FIRST CONVERSATION | 0.2 | 0.2 |
| WEIGHT CORRESPONDING TO THE SECOND CONVERSATION | 0.2 | 0.6 |
| WEIGHT CORRESPONDING TO THE THIRD CONVERSATION | 0.6 | 0.2 |

ELECTRONIC DEVICE AND METHOD FOR CONTROLLING ELECTRONIC DEVICE

CROSS-REFERENCE TO RELATED APPLICATIONS

This application is a continuation of International Application No. PCT/KR2021/012059, filed on Sep. 6, 2021, which is based on and claims priority to Korean Patent Application No. 10-2020-0121778, filed on Sep. 21, 2020, in the Korean Intellectual Property Office, the disclosures of which are incorporated by reference herein in their entireties.

BACKGROUND

1. Field

The disclosure relates to an electronic device and a method for controlling thereof, and for example, to an electronic device that manages a sentence input from a user based on a context of a conversation room generated through a messenger application, and a method for controlling thereof.

2. Description of Related Art

As communication technologies are developed, various types and functions of messenger applications that provide services enabling transmitting and receiving various types of data or conversations in real time among users are being developed. On a messenger application, a conversation room including a plurality of users as members may be generated, and the users may freely transmit and receive messages in real time in the generated conversation room.

Using various types of messenger applications and functions developed, users are generating conversation rooms corresponding to various groups (e.g., friends, colleagues, or bosses, etc.), and proceeding conversations with members of various groups in the generated conversation rooms.

However, in the case of a conventional messenger application, a problem that, in case a user mistakes a specific conversation room for another conversation room and inputs a message, an embarrassing situation may occur.

SUMMARY

Embodiments of the disclosure address the aforementioned need, and provide an electronic device that selects the most appropriate conversation room for a sentence that a user input based on relative characteristics of conversation rooms generated on a messenger application, and a method for controlling thereof.

An electronic device according to an example embodiment of the disclosure may include a memory and a processor configured to: input sentences input into a plurality of conversation rooms generated through a messenger application into a first model and acquire characteristic information of conversations conducted in the plurality of respective conversation rooms, based on a first sentence being input, input the first sentence and the characteristic information into a second model and acquire first scores indicating a similarity between the first sentence and the characteristics of the conversations conducted in the plurality of respective conversation rooms, input the first sentence and the sentences input into the plurality of conversation rooms into a third model and acquire second scores indicating relevance between the first sentence and the sentences input into the plurality of conversation rooms, identify a conversation room corresponding to the first sentence among the plurality of conversation rooms based on the characteristic information, the first scores, and the second scores, and input the first sentence into the identified conversation room.

A method for controlling an electronic device according to an example embodiment of the disclosure may include: inputting sentences input into a plurality of conversation rooms generated through a messenger application into a first model and acquiring characteristic information of conversations conducted in the plurality of respective conversation rooms, based on a first sentence being input, inputting the first sentence and the characteristic information into a second model and acquiring first scores indicating a similarity between the first sentence and the characteristics of the conversations conducted in the plurality of respective conversation rooms, inputting the first sentence and the sentences input into the plurality of conversation rooms into a third model and acquiring second scores indicating relevance between the first sentence and the sentences input into the plurality of conversation rooms, identifying a conversation room corresponding to the first sentence among the plurality of conversation rooms based on the characteristic information, the first scores, and the second scores, and inputting the first sentence into the identified conversation room.

As described above, according to various example embodiments of the disclosure, an electronic apparatus analyzes characteristics of conversation rooms and identifies a conversation room appropriate for an input user sentence, and accordingly, a user can use a messenger application more effectively and conveniently.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 3B is a diagram illustrating an example process wherein an electronic device classifies conversations conducted in a plurality of conversation rooms and acquires characteristic information of the respective conversation rooms according to various embodiments;

DETAILED DESCRIPTION

In describing the disclosure, a messenger application may refer, for example, to an application that provides a service so that users can perform communication by exchanging messages or various types of data in real time. A conversation room may refer, for example, to a space wherein a user can exchange messages or data with another user in real time in a messenger application, and it may also be referred to, for example, as a chatting or chat room.

Hereinafter, various example embodiments of the disclosure will be described in greater detail with reference to the drawings.

Figure 1:
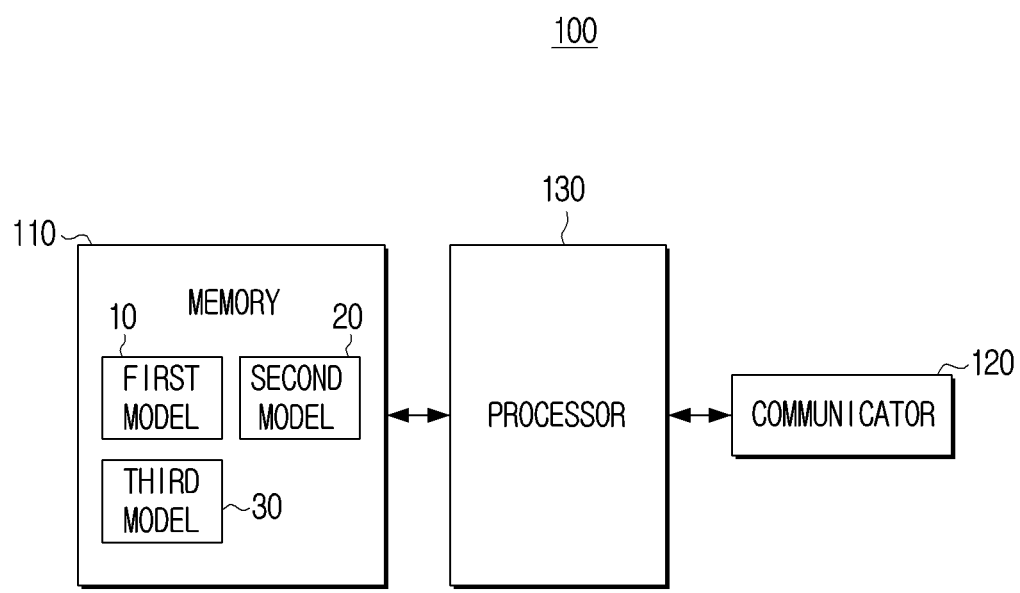
FIG. 1 is a block diagram illustrating an example configuration of an electronic device according to various embodiments.

FIG. 1 is a block diagram illustrating an example configuration of an electronic device 100 according to various embodiments. As illustrated in FIG. 1, the electronic device 100 may include a memory 110, a communicator (e.g., including communication circuitry) 120, and a processor (e.g., including processing circuitry) 130. The components illustrated in FIG. 1 are non-limiting examples for implementing the embodiments of the disclosure, and hardware and software components that may be apparent to those skilled in the art may additionally be included in the electronic device 100.

The memory 110 may store instructions or data related to at least one other component of the electronic device 100. The memory 110 may be accessed by the processor 130, and reading/recording/correcting/deleting/updating, etc. of data by the processor 130 may be performed.

The term memory may include the memory 110, a ROM (not shown) and a RAM (not shown) inside the processor 130, or a memory card (not shown) (e.g., a micro SD card, a memory stick) installed on the electronic device 100. Also, in the memory 110, programs and data, etc. for various kinds of screens to be displayed in a display area of the display may be stored.

The memory 110 may store a first model (e.g., including executable program instructions) 10, a second model (e.g., including executable program instructions) 20, and a third model (e.g., including executable program instructions) 30 which may include artificial intelligence models outputting characteristic information of conversations conducted in a plurality of respective conversation rooms, the first scores, and the second scores respectively.

The memory 110 may include the first model 10 which may include an artificial intelligence model trained to output characteristic information of conversations conducted in a plurality of respective conversation rooms. For example, the first model 10 is a model trained such that, if sentences input into a plurality of respective conversation rooms are input, outputs characteristic information of the respective conversation rooms. The characteristic information of conversations conducted in the conversation rooms may include third scores indicating the formality of the conversations conducted in the conversation rooms, fourth scores corresponding to the topics of the conversations conducted in the conversation rooms, and fifth scores indicating the degrees of activation of the conversation rooms.

The first model 10 may include a formality classification model 10-1 (refer to FIG. 3A) trained to output the third scores, a topic classification model 10-2 (refer to FIG. 3A) trained to output the fourth scores, and an activation degree classification model 10-3 (refer to FIG. 3A) trained to output the fifth scores. The feature that the first model 10 was trained may refer, for example, to the formality classification model 10-1, the topic classification model 10-2, and the activation degree classification model 10-3 included in the first model 10 being trained. An example configuration and learning process of the first model 10 will be described in greater detail below with reference to FIG. 3A.

The second model 20 may include an artificial intelligence model trained such that, if a first sentence input from a user and characteristic information of conversations conducted in the conversation rooms are input, outputs the first scores indicating similarity between the first sentence and the characteristics of the conversations conducted in the plurality of respective conversation rooms. The second model 20 may include a characteristic extraction model 20-1 (refer to FIG. 4) extracting the characteristic of the input first sentence and a similarity extraction model 20-2 (refer to FIG. 4) outputting the similarity between the characteristic of the first sentence and the characteristics of the conversations conducted in the plurality of respective conversation rooms. An example configuration and learning process of the second model 20 will be described in greater detail below with reference to FIG. 4.

The third model 30 may include an artificial intelligence model trained such that, if the first sentence and sentences input into the plurality of conversation rooms are input, outputs the second scores indicating relevance between the first sentence and the sentences input into the plurality of conversation rooms. The relevance between the first sentence and the sentences input into the plurality of conversation rooms may refer, for example, to the probability that the first sentence and the sentences input into the plurality of conversation rooms are related to each other as they include common words or have relations such as a question-response relation.

The highest scores for the respective conversation rooms among the scores indicating the relevance between the respective sentences input into the plurality of conversation rooms and the first sentence may be identified as the second scores corresponding to the respective conversation rooms. An example configuration and learning process of the third model 30 will be described in greater detail below with reference to FIG. 5.

Into the third model 30, the first sentence and sentences corresponding to the topic of the first sentence in a database wherein sentences recently input for the plurality of respective conversation rooms are classified into respective topics may be input. The database may refer, for example, to a database which extracted sentences in a predetermined number recently input for the plurality of respective conversation rooms, and organized the extracted sentences by classifying the sentences into a plurality of topics or beginning utterances without topics. An example embodiment related thereto will be described in greater detail below with reference to FIG. 5.

As illustrated in FIG. 1, the first model 10, the second model 20, and the third model 30 may be stored in the memory 110, but this is merely an example, and the models may, for example, and without limitation, be stored in an external server that trains and manages each model.

The memory 110 may include a dialogue system which includes an artificial intelligence model that can recognize a user voice and output a response thereto. The dialogue system may include, for example, and without limitation, an auto speech recognition (ASR) module that outputs a text corresponding to an input user voice, a natural language understanding (NLU) module that figures out the meaning of a text, and a text to speech (TTS) module that converts a text into a voice, etc. The dialogue system may be included in the memory 110, but it may also be included in a separate external server.

The memory 110 may include a non-volatile memory that can maintain stored information even if power supply is stopped and a volatile memory that needs constant power supply for maintaining stored information. FIG. 1 illustrates a case wherein the volatile memory is implemented as a separate component from the processor 130, but this is merely an example, and the volatile memory may be included in the processor 130 and implemented as a component of the processor 130.

The communicator 120 may include a circuit, and perform communication with an external device. Here, communicative connection of the communicator 120 with an external device may include performing communication via a third device (e.g., a repeater, a hub, an access point, a server, or a gateway, etc.).

The communicator 120 may include various communication circuitry included in various communication modules for performing communication with an external device. As an example, the communicator 120 may include a wireless communication module, and for example, it may include a cellular communication module using at least one of 5th Generation (5G), LTE, LTE Advanced (LTE-A), a code division multiple access (CDMA), a wideband CDMA (WCDMA), etc.

As another example, a wireless communication module may include, for example, at least one of wireless fidelity (WiFi), Bluetooth, Bluetooth low energy (BLE), Zigbee, radio frequency (RF), or a body area network (BAN). However, this is merely an example, and the communicator 120 may include a wired communication module.

The communicator 120 may transmit a sentence input from a user to a server that manages a messenger application. The feature that a sentence input from a user is input into a specific conversation room may include a process wherein a sentence input from a user is transmitted to a server that manages a messenger application, and the server inputs the transmitted sentence into a specific conversation room.

In case the first model 10, the second model 20, and the third model 30 are stored in an external server, the communicator 120 may transmit at least one of the first sentence, the characteristic information of the conversations conducted in the plurality of respective conversation rooms, or sentences input into the plurality of conversation rooms to the external server storing the respective artificial intelligence models. Then, the communicator 120 may receive at least one of the characteristic information of the conversations conducted in the plurality of respective conversation rooms, the first scores, or the second scores from the external server.

The processor 130 may be electronically connected with the memory 110, include various processing circuitry and control the overall functions and operations of the electronic device 100. The processor 130 may load the first model 10, the second model 20, or the third model 30 from the non-volatile memory to the volatile memory. Loading may refer, for example, to an operation of calling data stored in the non-volatile memory into the volatile memory and storing the data, so that the processor 130 can access the data.

The processor 130 may input sentences input into the plurality of conversation rooms generated through a messenger application into the first model 10, and acquire characteristic information of the conversations conducted in the plurality of respective conversation rooms.

For example, the processor 130 may classify the formality levels of the conversations conducted in the plurality of respective conversation rooms through the formality classification model in the first model 10, and acquire third scores corresponding to the plurality of respective conversation rooms based on the classified formality levels. The third scores are scores indicating the formality of the conversations conducted in the conversation rooms.

As the third score is higher, it may refer, for example, to the conversation conducted in the conversation room being a conversation having a high formality level as honorific terms, etc. are included. A learning process of the formality classification model will be described in greater detail below with reference to FIG. 3A.

The processor 130 may classify the topics of the conversations conducted in the plurality of respective conversation rooms into a plurality of categories through the topic classification model in the first model 10, and acquire fourth scores corresponding to the plurality of respective conversation rooms based on the ratios of the plurality of classified categories in the conversations conducted in the respective conversation rooms. The fourth scores may include scores including the plurality of topic categories and weights related to the ratios allotted to the respective categories.

For example, in case the topics of the conversation conducted in the first conversation room are travel and politics, the topic classification model may classify the topics of the conversation into travel and politics categories. Then, in case the ratios of the travel and politics categories in the conversation conducted in the first conversation room are 3:7, the topic classification model may acquire the fourth score wherein a weight of 3 is allotted to the travel category and a weight of 7 is allotted to the politics category. A learning process of the topic classification model will be described in greater detail below with reference to FIG. 3A.

The processor 130 may acquire fifth scores indicating the degrees of activation of the conversations conducted in the plurality of respective conversation rooms through the activation degree classification model in the first model 10. The fifth score may include an activation index based on the frequency and the time points of uploading messages of participants in the conversation room and a participation index based on the frequency and the time points of transmitting messages to the conversation room by the user.

As the activation index is higher in the fifth score, it may refer, for example, to the frequency of participation in the conversation of the participants who participated in the conversation room being high, and as the participation index is higher in the fifth score, it may refer, for example, to the frequency that the user participated in the conversation in the conversation room being high. A learning process of the activation degree classification model will be described in greater detail below with reference to FIG. 3A.

As described above, the processor 130 may acquire the third scores and the fourth scores using the entire conversations conducted in the plurality of conversation rooms through the first model 10. The processor 130 may classify the conversations conducted in the plurality of conversation rooms into a first conversation conducted during the entire time, a second conversation conducted during a predetermined time, and a third conversation into which the user input sentences through the first model 10.

The second conversation conducted during a predetermined time may refer, for example, to a conversation conducted on the very day when the first sentence was input, or a conversation input during one hour before the first sentence was input. However, this is merely an example, and the predetermined time may be changed variously by a user.

The processor 130 may identify the formality levels and the topics corresponding to the respective first conversation, second conversation, and third conversation, and acquire the third scores and the fourth scores corresponding to the plurality of respective conversation rooms based on the identified formality levels and topics.

For example, to the respective first conversation, second conversation, and third conversation, predetermined weights may have been matched. The processor 130 may apply the predetermined weights to the scores corresponding to the formality levels and the topics of the respective first conversation, second conversation, and third conversation, and acquire the third scores and the fourth scores corresponding to the plurality of respective conversation rooms. An embodiment related thereto will be described in greater detail below with reference to FIG. 3B.

When the first sentence is input from the user, the processor 130 may input the first sentence and the characteristic information of the conversations conducted in the plurality of respective conversation rooms into the second model 20, and acquire the first scores indicating the similarity between the first sentence and the characteristics of the conversations conducted in the plurality of respective conversation rooms.

For example, the processor 130 may acquire the score indicating the formality of the first sentence and the score corresponding to the topic through the characteristic extraction model in the second model 20. The processor 130 may calculate the first similarity between the third scores of the plurality of respective conversation rooms and the score indicating the formality of the first sentence through the similarity extraction model in the second model 20, and acquire the second similarity by comparing the fourth scores of the plurality of respective conversation rooms and the score corresponding to the topic of the first sentence.

The processor 130 may sum up the first similarity and the second similarity and acquire the first scores indicating the similarity between the first sentence and the characteristics of the conversations conducted in the plurality of respective conversation rooms. The feature that the first score of a specific conversation room is high may refer, for example, to the characteristic of the first sentence and the characteristic of the conversation conducted in the specific conversation room being more similar. An embodiment related thereto will be described in greater detail below with reference to FIG. 4.

The processor 130 may store a database wherein at least one sentence recently input for the plurality of respective conversation rooms are classified into respective topics based on the degrees of activation of the plurality of conversation rooms in the memory 110.

For example, the processor 130 may store a database wherein sentences in the number of N (N is a natural number which is 1 or bigger) among sentences recently input into the first conversation room among the plurality of conversation rooms are classified into a plurality of topics in the memory 110. When the processor 130 classifies the sentences in the number of N into a plurality of topics, it may use the plurality of topic categories classified through the first model 10.

The processor 130 may limit the number of sentences stored for the respective topics in the database to the number of X (X is a natural number which is 1 or bigger). For example, in case the number of sentences matched to the travel category in the database exceeds the number of X as a conversation proceeds in the first conversation room, the processor 130 may remove the sentence that was input the earliest among the prestored sentences, and include a newly input sentence into the travel category.

As another example, the database may include a no topic category wherein sentences not including a specific topic are collected. In the no topic category, sentences which are not included in the topic categories classified in the database and of which topics cannot be specified (e.g., a beginning utterance for proceeding with a conversation about a new topic, etc.) may be included.

The processor 130 may determine the size of X based on the degrees of activation of the respective conversation rooms. As the degree of activation of a conversation room is higher, the processor 130 may determine the number of sentences matched per topic and stored in the database corresponding to the conversation room as a bigger value. Here, the processor 130 may determine the size of X using the fifth scores indicating the degrees of activation of the respective conversation rooms acquired through the activation degree classification model of the first model 10.

The processor 130 may input sentences corresponding to the topic of the first sentence in the database and the first sentence into the third model 30 and acquire scores indicating the relevance between the sentences corresponding to the topic of the first sentence in the database and the first sentence. The relevance may refer, for example, to the probability that the first sentence and the sentences corresponding to the topic of the first sentence in the database are sentences related to each other as they have relations such as a question-response relation or include common words.

In case the weight allotted to the topic of the first sentence acquired through the characteristic extraction model of the second model does not exceed a threshold value, the processor 130 may input the sentences included in the no topic category in the database and the first sentence into the third model 30.

For example, in case the first sentence is a beginning utterance for proceeding with a conversation about a new topic and is a sentence not included in the topics included in the database, the weight matched to at least one topic of the first sentence acquired through the second model may be smaller than the threshold value. In case the weight matched to at least one topic of the first sentence is smaller than the threshold value, the processor 130 may identify that the first sentence is a sentence not included in the specific topics collected in the database. The processor 130 may input the first sentence and the sentences included in the no topic category in the database into the third model 30, and acquire scores indicating the relevance between the first sentence and the sentences included in the no topic category in the database.

The processor 130 may identify the highest scores for the respective conversation rooms among the scores indicating the relevance between the first sentence and the sentences corresponding to the topic of the first sentence in the database, and identify the identified highest scores for the respective conversation rooms as the second scores corresponding to the plurality of respective conversation rooms.

An example related thereto will be described in greater detail below with reference to FIG. 5.

The processor 130 may sum up the first scores and the second scores corresponding to the plurality of respective conversation rooms and the fifth scores indicating the degrees of activation of the plurality of respective conversation rooms, and acquire summed-up scores corresponding to the plurality of respective conversation rooms. Then, the processor 130 may identify the conversation room having the highest summed-up score among the plurality of conversation rooms as the conversation room corresponding to the first sentence.

For example, the processor 120 may identify a conversation room that is most appropriate for the first sentence input from the user based on the degrees of activation of the respective conversation rooms, the similarity of the formalities and the topics between the conversations conducted in the respective conversation rooms and the sentence input from the user, and the relevance between the input sentence and sentences input in the conversation room.

As an example, the processor 130 may input the first sentence into the identified conversation room. As another example, the processor 130 may provide a message inquiring whether to input the first sentence into the conversation room identified to correspond to the first sentence.

The processor 130 may adjust weights applied to the respective scores for acquiring summed-up scores based on the characteristic of the first sentence or the sizes of the scores corresponding to the plurality of respective conversation rooms. For example, the processor 130 may adjust the weights of elements of the summed-up scores according to the characteristic of the first sentence or the sizes of the scores corresponding to the plurality of respective conversation rooms.

For example, in case the score corresponding to the topic of the first sentence is smaller than a first predetermined value, the processor 130 may apply a weight that makes the ratio of the fourth scores small among the summed-up scores of the plurality of conversation rooms to the fourth scores. As classification of the topic for the first sentence input from the user is not an important element for selecting a conversation room appropriate for the first sentence, the ratio of the fourth scores among the summed-up scores may be reduced.

As another example, in case the degrees of formality of the conversations conducted in the entire plurality of conversation rooms are low, a slight difference in the degrees of formality may act as a big distinguishing point among the conversation rooms. Accordingly, in case all of the third scores corresponding to the plurality of respective conversation rooms are smaller than a second predetermined value, the processor 130 may apply a weight that makes the ratio of the third scores big among the summed-up scores to the third scores.

If a second sentence is input from the user in the first conversation room selected by the user among the plurality of conversation rooms, the processor 130 may acquire the first scores and the second scores corresponding to the plurality of respective conversation rooms based on the input second sentence. As described above, the processor 130 may acquire the first scores and the second scores corresponding to the plurality of respective conversation rooms based on the second sentence using the first model, the second model, and the third model.

The processor 130 may acquire summed-up scores corresponding to the plurality of respective conversation rooms based on the first scores and the second scores acquired based on the second sentence and the degrees of activation of the plurality of respective conversation rooms. In case there is a second conversation room having a summed-up score of a higher value than the summed-up score corresponding to the first conversation room among the plurality of conversation rooms, the processor 130 may provide a message inquiring whether to transmit the second sentence to the second conversation room.

For example, if it is identified that there is a conversation room that is more appropriate for the second sentence than the first conversation room selected by the user, the processor 130 may provide a message inquiring whether to transmit the second sentence to the conversation room that is more appropriate than the first conversation room. Accordingly, the user may identify whether he input a message into a conversation room that he wrongly selected.

The functions related to artificial intelligence according to the disclosure are operated through the processor 130 and the memory 110. The processor 130 may include one or a plurality of processors. The one or plurality of processors may include generic-purpose processors such as, for example, and without limitation, a central processing unit (CPU), an application processor (AP), a digital signal processor (DSP), etc., graphic-dedicated processors such as a graphic processing unit (GPU), a vision processing unit (VPU), etc., or artificial intelligence-dedicated processors such as a neural processing unit (NPU), etc.

The one or plurality of processors 130 perform control such that input data is processed according to pre-defined operation rules or an artificial intelligence model stored in the memory 110. In case the one or plurality of processors are artificial intelligence-dedicated processors, the artificial intelligence-dedicated processors may be designed as a hardware structure specified for processing of a specific artificial intelligence model.

The predefined operation rules or the artificial intelligence model may be characterized in that they are made through learning. Being made through learning may refer, for example, to a basic artificial intelligence model being trained using a plurality of training data by a learning algorithm, and predefined operation rules or an artificial intelligence model set to perform a desired characteristic (or, purpose) are made. Such learning may be performed in a device wherein artificial intelligence is performed itself according to the disclosure, or performed through a separate server and/or system.

As examples of learning algorithms, there are supervised learning, unsupervised learning, semi-supervised learning, or reinforcement learning, but learning algorithms are not limited to the aforementioned examples.

An artificial intelligence model may include a plurality of artificial neural networks, and the artificial neural networks may include a plurality of layers. Each of the plurality of neural network layers has a plurality of weight values, and performs a neural network operation through an operation between the operation result of the previous layer and the plurality of weight values. The plurality of weight values included by the plurality of neural network layers may be optimized by the learning result of the artificial intelligence model. For example, the plurality of weight values may be updated such that a loss value or a cost value acquired at the artificial intelligence model during a learning process is reduced or minimized.

As examples of artificial neural networks, there are a convolutional neural network (CNN), a deep neural network (DNN), a recurrent neural network (RNN), a restricted Boltzmann machine (RBM), a deep belief network (DBN), a bidirectional recurrent deep neural network (BRDNN), and deep Q-networks, but the artificial neural network in the disclosure is not limited to the aforementioned examples excluding specified cases.

Figure 2:
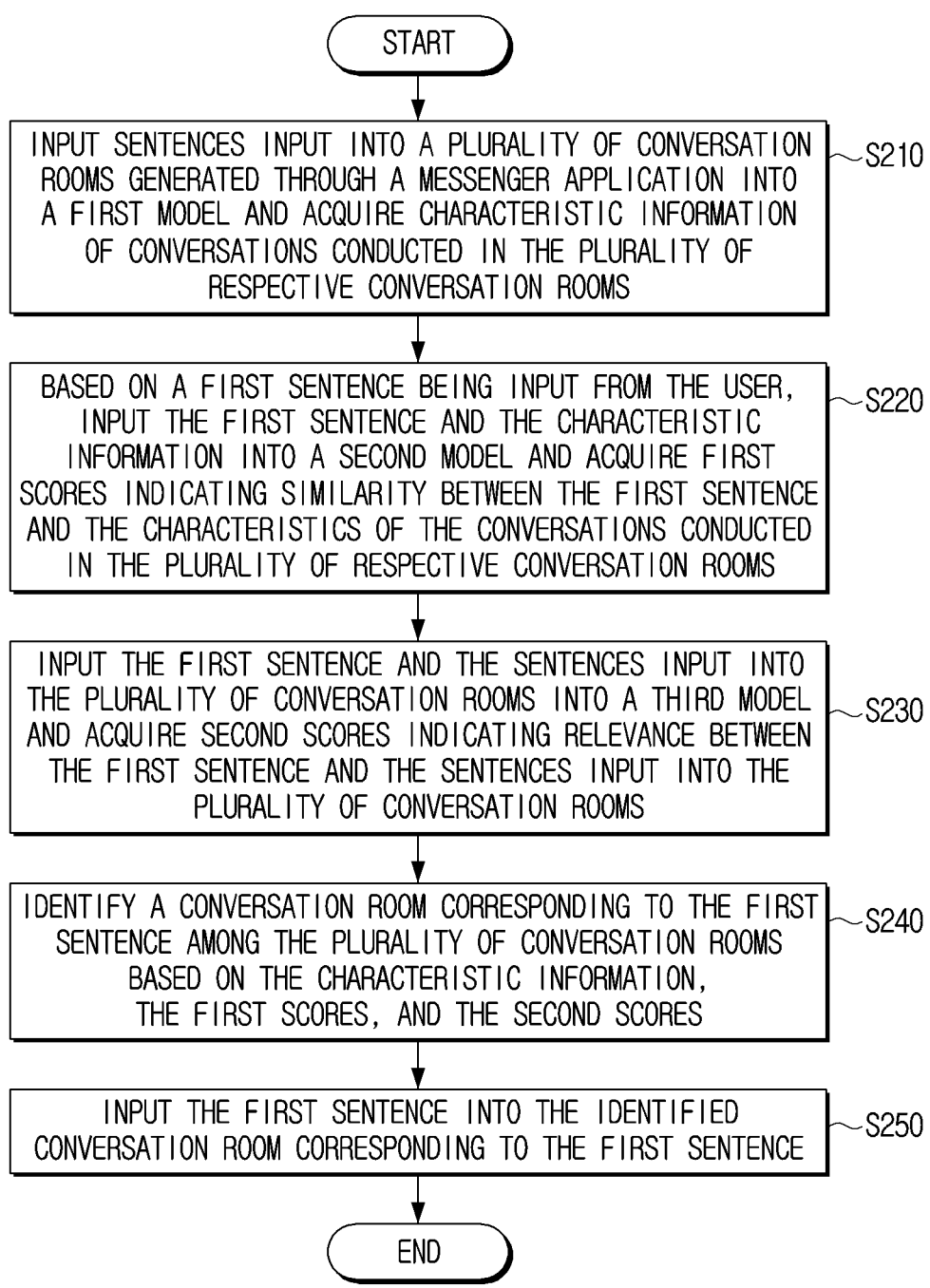
FIG. 2 is a flowchart illustrating an example method for controlling an electronic device according to various embodiments.

FIG. 2 is a flowchart illustrating an example method for controlling the electronic device 100 according to various embodiments.

The electronic device 100 may input sentences input into a plurality of conversation rooms generated through a messenger application into a first model and acquire characteristic information of conversations conducted in the plurality of respective conversation rooms in operation S210.

For example, the electronic device 100 may input sentences input into the plurality of conversation rooms into the first model and acquire characteristic information including third scores indicating the formality of the conversations conducted in the plurality of respective conversation rooms, fourth scores corresponding to the topics of the conversations conducted in the plurality of respective conversation rooms, and fifth scores indicating the degrees of activation of the plurality of respective conversation rooms. An embodiment related thereto will be described in greater detail below with reference to FIG. 3A and FIG. 3B.

When a first sentence is input from a user, the electronic device 100 may input the first sentence and the characteristic information of the plurality of respective conversation rooms into a second model and acquire first scores indicating similarity between the first sentence and the characteristics of the conversations conducted in the plurality of respective conversation rooms in operation S220. For example, the electronic device 100 may extract the characteristic of the first sentence through the second model, and acquire first scores indicating similarity between the extracted characteristic of the first sentence and the characteristics of the plurality of conversation rooms. An embodiment related thereto will be described in detail with reference to FIG. 4.

The electronic device 100 may input the first sentence and the sentences input into the plurality of conversation rooms into a third model and acquire second scores indicating relevance between the first sentence and the sentences input into the plurality of conversation rooms in operation S230. For example, through the third model, the electronic device 100 may acquire second scores indicating the probability that the first sentence and at least one sentence among the sentences input into the plurality of conversation rooms are sentences related to each other, as they include common words, or have relations such as a question-response relation.

The electronic device 100 may input the entire sentences input into the plurality of conversation rooms into the third model, but it may also input sentences corresponding to the topic of the first sentence in a database wherein sentences recently input for the plurality of respective conversation rooms are classified into respective topics into the third model. An embodiment related thereto will be described in greater detail below with reference to FIG. 5.

The electronic device 100 may identify a conversation room corresponding to the first sentence among the plurality of conversation rooms based on the characteristic information, the first scores, and the second scores in operation S240. The electronic device 100 may, for example, sum up the first scores and the second scores corresponding to the plurality of respective conversation rooms and the fifth scores indicating the degrees of activation of the plurality of respective conversation rooms in the characteristic information, and acquire summed-up scores corresponding to the plurality of respective conversation rooms. The electronic device 100 may, for example, identify the conversation room having the highest summed-up score among the plurality of conversation rooms as the conversation room corresponding to the first sentence.

The electronic device 100 may input the first sentence into the identified conversation room corresponding to the first sentence in operation S250. Prior to inputting the first sentence into the conversation room corresponding to the first sentence, the electronic device 100 may provide a message that the first sentence is input into the conversation room corresponding to the first sentence to the user. After receiving confirmation from the user, the electronic device 100 may input the first sentence into the identified conversation room corresponding to the first sentence.

Figure 3A:
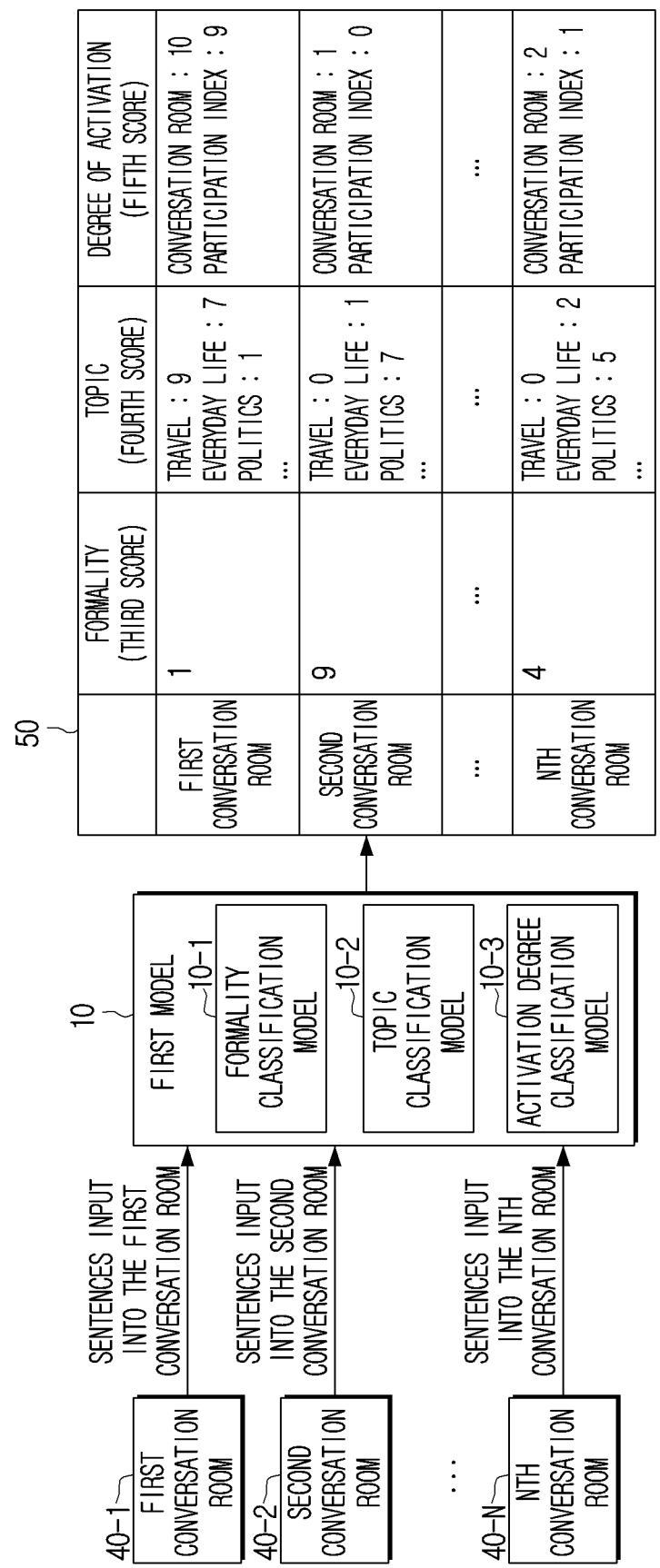
FIG. 3A is a diagram illustrating an example process wherein an electronic device acquires characteristic information of a plurality of respective conversation rooms through a first model according to various embodiments.

FIG. 3A is a diagram illustrating an example process wherein the electronic device 100 acquires characteristic information of a plurality of respective conversation rooms through the first model 10 according to various embodiments.

As illustrated in FIG. 3A, the formality classification model 10-1, the topic classification model 10-2, and the activation degree classification model 10-3 may be implemented in a form of being included in the first model 10 as a component of the first model 10. However, this is merely an example, and the respective models 10-1, 10-2, 10-3 may be implemented as separate models.

The electronic device 100 may input sentences input into a plurality of conversation rooms 40-1, 40-2, . . . 40-N into the first model 10 and acquire characteristic information 50 of the conversations conducted in the plurality of respective conversation rooms.

As an example, the electronic device 100 may input the sentences input into the plurality of conversation rooms 40-1, 40-2, . . . 40-N into the formality classification model 10-1 in the first model 10 and acquire third scores indicating the formality of the conversations conducted in the respective conversation rooms. As the third score of a specific conversation room is higher, it may refer, for example, to the conversation conducted in the specific conversation room being a conversation having a high formality level.

The formality classification model 10-1 may include a model trained based on formal language training data (e.g., news scripts, columns, speeches, etc.) and informal language training data (e.g., movie subtitles, community crawling data, etc.). The trained formality classification model 10-1 may classify the formality levels of the sentences input into the conversation rooms, and output third scores corresponding to the classified formality levels.

For example, as illustrated in FIG. 3A, in case sentences input into the first conversation room 40-1 are informal sentences as a lot of swearing words, etc. are included, the formality classification model 10-1 may classify the sentences input into the first conversation room 40-1 as a low formality level, and output a third score corresponding to the classified formality level (e.g., 1).

As another example, in case sentences input into the second conversation room 40-2 are formal sentences including a lot of highly honorific terms, the formality classification model 10-1 may classify the sentences input into the second conversation room 40-2 as a high formality level, and output a third score corresponding to the classified formality level (e.g., 9).

As an example, the electronic device 100 may input the sentences input into the plurality of conversation rooms 40-1, 40-2, . . . 40-N into the topic classification model 10-2 and acquire fourth scores corresponding to the topics of the conversations conducted in the respective conversation rooms.

The topic classification model 10-2 may be trained to classify the topics of the sentences input into the conversation rooms into a plurality of categories based on language training data including various topics, and output fourth scores corresponding to the plurality of respective conversation rooms based on the ratios of the plurality of categories in the entire sentences of the conversation rooms. The fourth scores may be values including a plurality of topic categories and weights allotted according to the ratios of the topic categories.

For example, as illustrated in FIG. 3A, the topic classification model 10-2 may classify sentences input into the first conversation room 40-1 into travel, everyday life, and politics, etc., and acquire fourth scores including a score indicating the ratios of the topic categories classified in the conversations among the entire sentences input into the first conversation room 40-1 (e.g., travel: 9, everyday life: 7, politics: 1, etc.).

As another example, the topic classification model 10-2 may classify sentences input into the second conversation room 40-2 into travel, everyday life, and politics, etc., and acquire fourth scores including a score indicating the ratios of the topic categories classified in the entire conversations (e.g., travel: 0, everyday life: 1, politics: 7, etc.).

As an example, the electronic device 100 may input the sentences input into the plurality of conversation rooms 40-1, 40-2, . . . 40-N into the activation degree classification model 10-3 in the first model 10 and acquire fifth scores indicating the degrees of activation of the respective conversation rooms.

The fifth score may include an activation index indicating the frequency of uploading messages of people participating in a conversation room and a participation index indicating the frequency of transmitting messages to a conversation room by the user. The feature that the activation index is high refer, for example, to people participating in a conversation room proceeding with a conversation more actively, and the feature that the participation index is high may refer, for example, to the user inputting messages into a specific conversation room more actively.

The activation degree classification model 10-3 may be trained to output fifth scores including activation indices and participation indices for the respective conversation rooms based on the sentences input into the plurality of respective conversation rooms and the time points when the sentences were input.

To the sentences input into the plurality of respective conversation rooms that are input into the first model 10 by the electronic device 100, information on the time points when the sentences were input may be matched. Accordingly, the electronic device 100 may input the sentences input into the plurality of respective conversation rooms to which the time points of input are matched into the activation degree classification model 10-3 in the first model, and acquire fifth scores of the respective conversation rooms.

FIG. 3B is a diagram illustrating an example process wherein the electronic device 100 classifies conversations conducted in a plurality of conversation rooms and acquires characteristic information of the respective conversation rooms according to various embodiments.

As illustrated in FIG. 3B, the electronic device 100 may classify conversations conducted in a plurality of conversation rooms into a first conversation conducted during the entire time, a second conversation conducted during a predetermined time, and a third conversation into which the user input sentences through the first model 10. Then, the electronic device 100 may identify the formality levels and the topics corresponding to the respective first conversation, second conversation, and third conversation through the first model 10, and acquire characteristic information 50-1 including scores corresponding to the identified formality levels and topics.

The electronic device 100 may apply weights 50-2 corresponding to the respective first conversation, second conversation, and third conversation to the acquired characteristic information 50-1, and acquire the third scores and the fourth scores corresponding to the plurality of respective conversation rooms.

For example, when identifying a conversation room appropriate for a sentence input from a user, a characteristic related to the formality indicated in the sentence input by the user may be more important compared to the characteristics related to the formalities of the entire conversations conducted in the conversation rooms. Accordingly, regarding the formality, a weight corresponding to the first conversation may be 0.2, a weight corresponding to the second conversation may be 0.2, and a weight corresponding to the third conversation may be 0.6. The electronic device 100 may apply scores corresponding to the formality levels (the first conversation: 2, the second conversation: 1, the third conversation: 5) in the acquired characteristic information 50-1 and the weights of the respective conversations and acquire the third score of the first conversation room (e.g., 2*0.2+1*0.2+5*0.6=3.6).

As another example, when identifying a conversation room appropriate for a sentence input from a user, the topic of a conversation conducted during a predetermined time in a conversation room may be the most important. Accordingly, regarding the topics, a weight corresponding to the first conversation may be 0.2, a weight corresponding to the second conversation may be 0.6, and a weight corresponding to the third conversation may be 0.2. The electronic device 100 may apply scores corresponding to the topics in the acquired characteristic information 50-1 and the weights of the respective conversations and acquire the fourth score of the first conversation room.

Figure 4:
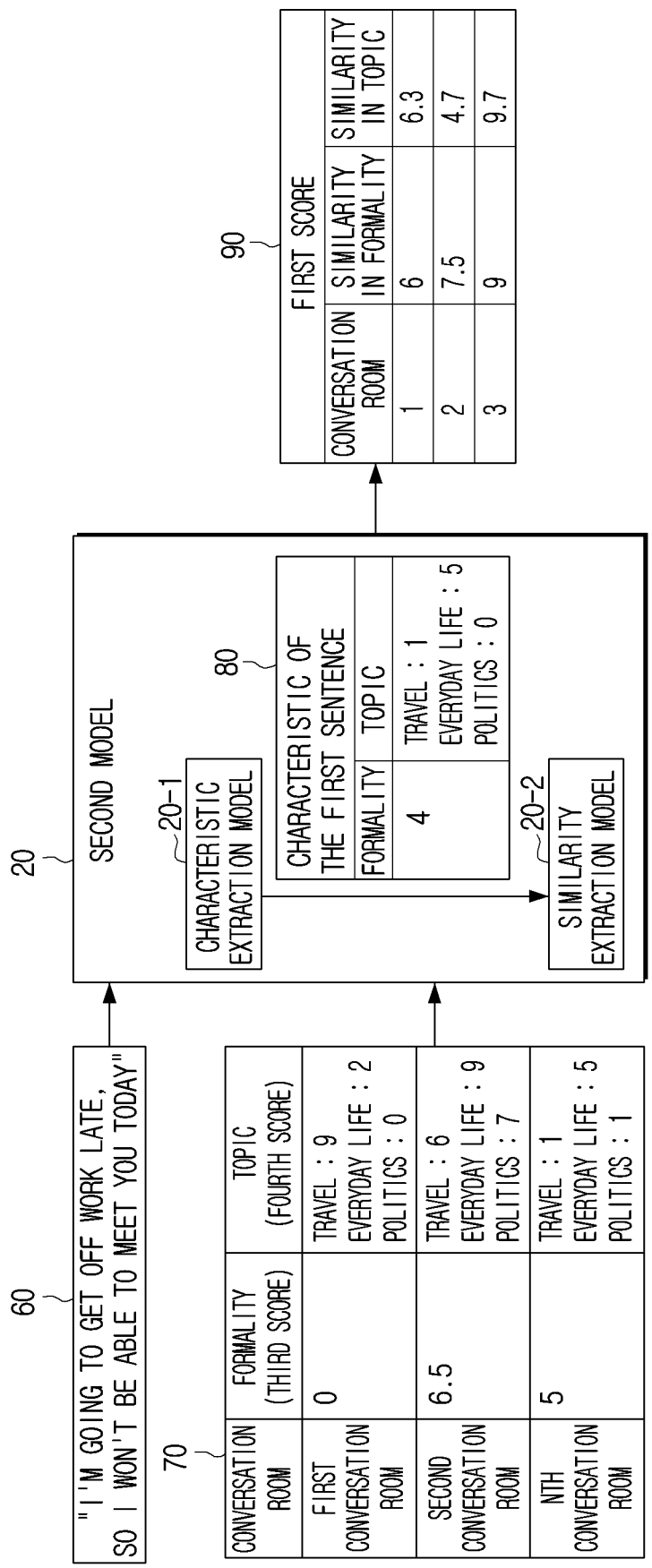
FIG. 4 is a diagram illustrating an example process wherein an electronic device acquires first scores of a plurality of respective conversation rooms through a second model according to various embodiments.

FIG. 4 is a diagram illustrating an example process wherein the electronic device 100 acquires first scores of a plurality of respective conversation rooms through the second model 20 according to various embodiments. As illustrated in FIG. 4, the characteristic extraction model 20-1 and the similarity extraction model 20-2 may be implemented in a form of being included in the second model 20 as a component of the second model 20. However, this is merely an example, and the respective models 20-1, 20-2 may be implemented as separate models.

The electronic device 100 may input the first sentence input from the user (e.g., "I'm going to get off work late, so I won't be able to meet you today") 60 and the characteristic information 70 of the conversations conducted in the plurality of respective conversation rooms into the second model 20 and acquire the first scores 90.

For example, the electronic device 100 may input the first sentence 60 into the characteristic extraction model 20-1 in the second model 20 and acquire characteristic information 80 of the first sentence. The characteristic extraction model 20-1 is an artificial intelligence model trained to output a score corresponding to the formality level of an input sentence, classify the topic of the input sentence, and output a score indicating the ratio of the classified topic in the first sentence. That is, the characteristic extraction model 20-1 may be implemented as a model performing an operation performed by the first model 10 for a sentence input from a user.

The electronic device 100 may input the characteristics 80 of the first sentence and the characteristic information 70 of the conversations conducted in the plurality of respective conversation rooms into the similarity extraction model 20-2 and acquire the first scores 90.

The similarity extraction model 20-2 may refer, for example, to a model that outputs similarity between the characteristics 80 of the first sentence and the characteristic information 70 of the conversations conducted in the plurality of respective conversation rooms. The characteristics 80 of the first sentence and the characteristic information 70 of the plurality of conversation rooms may be implemented in forms of vectors. The similarity extraction model 20-2 may apply a predefined weight to the difference in distance between the characteristics 80 of the first sentence and the characteristic information 70 of the plurality of conversation rooms implemented as vectors, and output the first scores 90 indicating similarity.

For example, the similarity extraction model 20-2 may compare the third score of the first conversation room in the characteristic information 70 and a score corresponding to the formality level among the characteristics 80 of the first sentence, and acquire a score indicating the similarity in the formality between the first sentence 60 and the conversation conducted in the first conversation room among the first scores 90. The similarity extraction model 20-2 may compare the fourth score of the first conversation room in the characteristic information 70 and a score corresponding to the topic among the characteristics 80 of the first sentence, and acquire a score indicating the similarity in the topics between the first sentence 60 and the conversation conducted in the first conversation room among the first scores 90.

As illustrated in FIG. 4, the feature that the similarity in the formality and the similarity in the topic of the third conversation room among the first scores 90 of the plurality of respective conversation rooms are the highest may refer, for example, to the formality and the topic of the third conversation room being the most similar to the formality and the topic of the first sentence 60.

Figure 5:
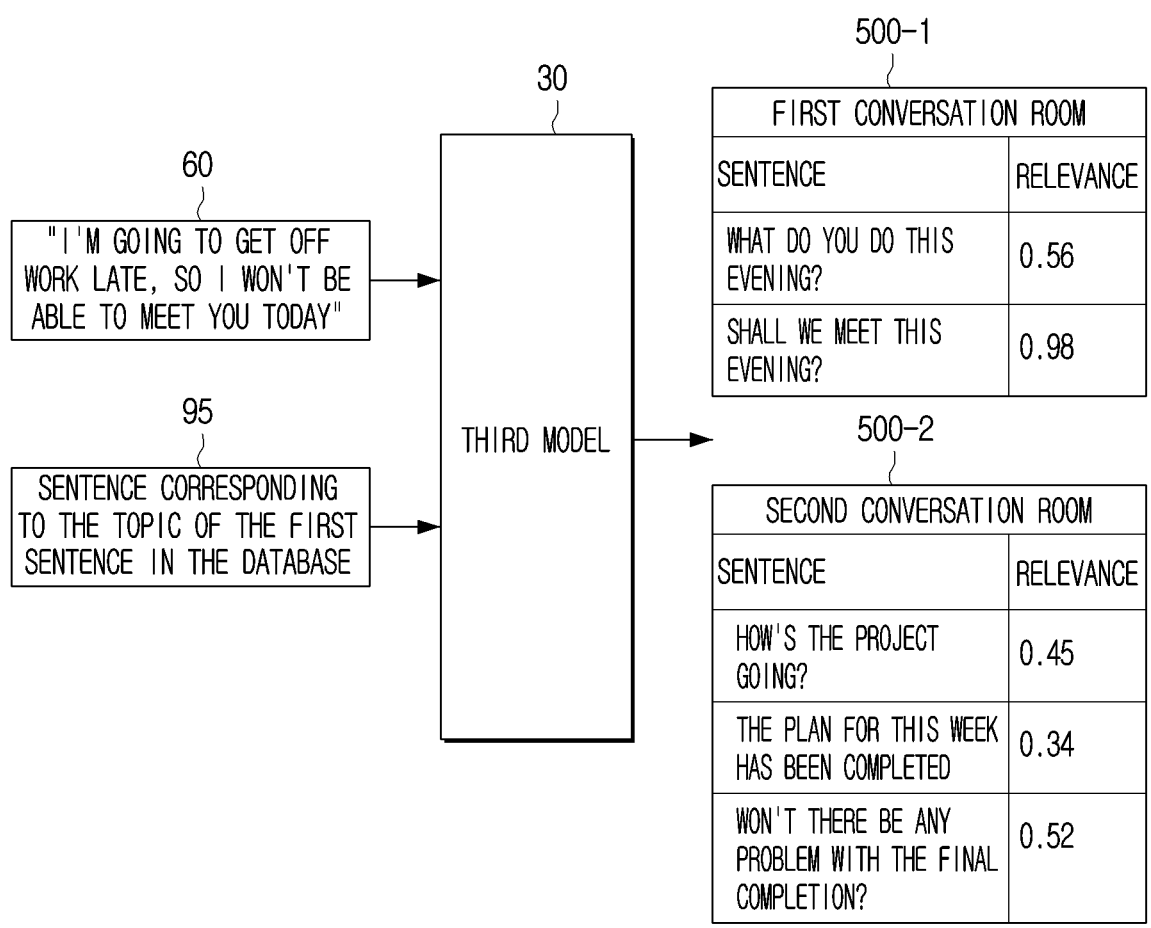
FIG. 5 is a diagram illustrating an example process wherein an electronic device acquires second scores of a plurality of respective conversation rooms through a third model according to various embodiments.

FIG. 5 is a diagram illustrating an example process wherein the electronic device 100 acquires second scores of a plurality of respective conversation rooms through the third model 30 according to various embodiments.

The electronic device 100 may input the first sentence and sentences input into a plurality of conversation rooms into the third model 30, and acquire second scores indicating relevance between the first sentence and the sentences input into the plurality of conversation rooms.

The electronic device 100 may input the entire sentences input into the plurality of conversation rooms into the third model 30. However, this is merely an example, and as illustrated in FIG. 5, the electronic device 100 may input a sentence 95 corresponding to the topic of the first sentence 60 in a database wherein sentences recently input for the plurality of respective conversation rooms are classified into respective topics into the third model 30, and acquire second scores of the plurality of conversation rooms.

The electronic device 100 may store the database wherein at least one sentence recently input for the plurality of respective conversation rooms are classified into respective topics based on the degrees of activation of the plurality of respective conversation rooms. The database may include data wherein sentences in the number of N among the sentences recently input for the plurality of respective conversation rooms are classified into a plurality of topics. The database may include sentences in the number of X for the respective topics. The database may include a no topic category wherein sentences not related to predetermined topics are collected.

The electronic device 100 may identify sentences 95 corresponding to the topic of the first sentence in the database, and input the identified sentences 95 and the first sentence 60 into the third model 30, and acquire scores indicating relevance between the sentences 95 corresponding to the topic of the first sentence and the first sentence 60. For example, in case a specific sentence among the sentences 95 corresponding to the topic of the first sentence is a question sentence, and the first sentence 60 is a response sentence, there is a question-response relation between the two sentences, and thus the relevance may be high. Accordingly, when the specific sentence and the first sentence 60 are input, the third model may output a score indicating relevance of a high value.

The electronic device 100 may identify the highest scores for the respective conversation rooms among the acquired scores indicating relevance between the sentences corresponding to the topic of the first sentence and the first sentence 60. Then, the electronic device 100 may identify the identified highest scores for the respective conversation rooms as the second scores corresponding to the plurality of respective conversation rooms.

For example, as illustrated in FIG. 5, the electronic device 100 may acquire scores 500-1, 500-2 indicating relevance between the sentences included in the respective first conversation room and second conversation room among the sentences corresponding to the topic of the first sentence 60 and the first sentence 60. Here, among the sentences input into the first conversation room, the sentence 'Shall we meet this evening?' has the highest relevance of 0.98 with the first sentence 60, and thus the electronic device 100 may identify the second score corresponding to the first conversation room as 0.98. As another example, among the sentences input into the second conversation room, the sentence 'Won't there be any problem with the final completion?' has the highest relevance of 0.52 with the first sentence 60, and thus the electronic device 100 may identify the second score corresponding to the second conversation room as 0.52.

Figure 6:
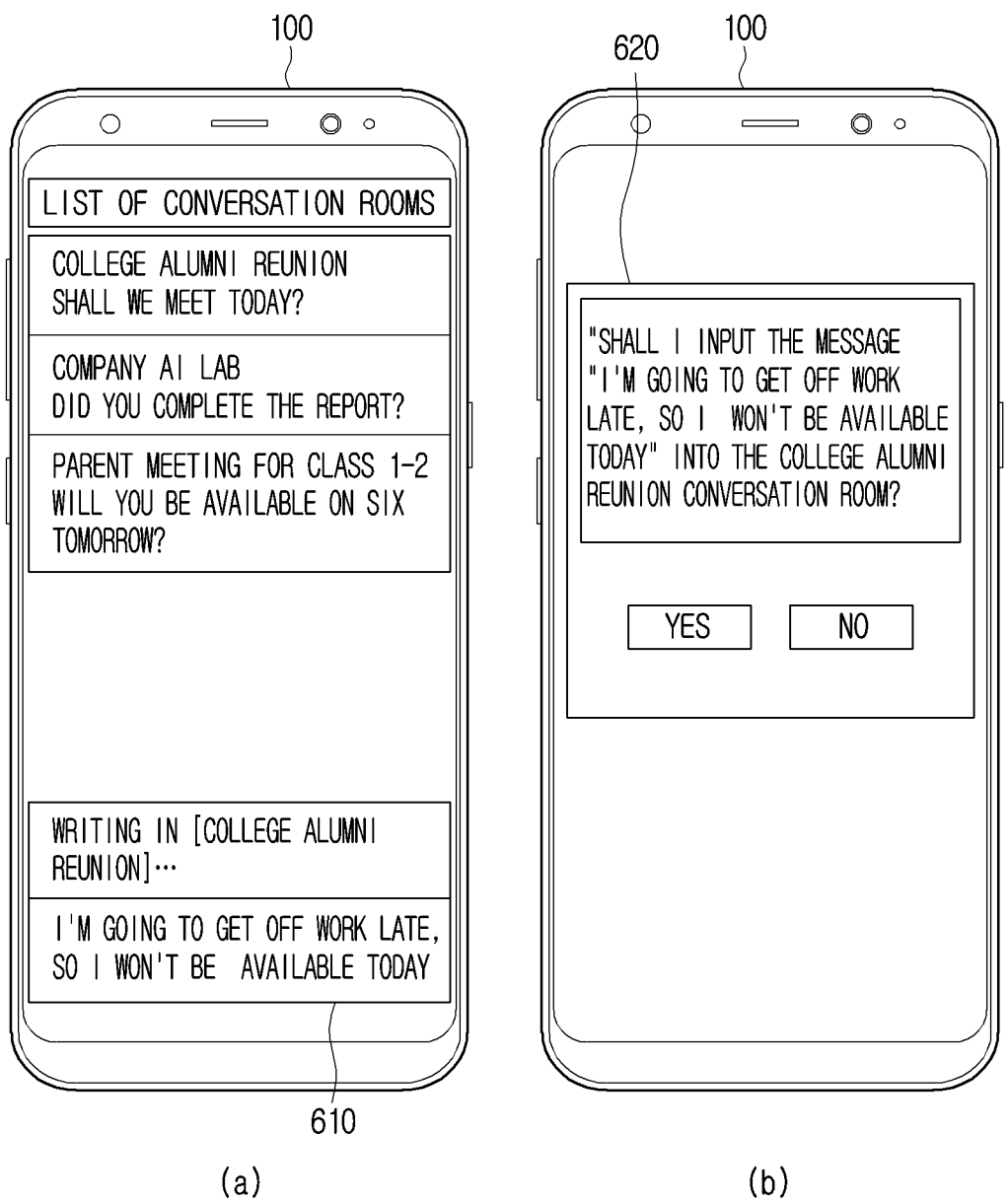
FIG. 6 is a diagram illustrating an example process wherein an electronic device selects a conversation room appropriate for an input text according to various embodiments.

FIG. 6 is a diagram illustrating an example process wherein the electronic device 100 selects a conversation room appropriate for an input text according to various embodiments. In FIG. 6, the electronic device 100 is implemented as a smartphone, but this is merely an example, and the electronic device 100 may be implemented as at least one of, for example, and without limitation, a tablet PC, a desktop PC, a laptop PC, a netbook computer, an AI speaker, or a wearable device, but is not limited thereto.

As illustrated in (a) of FIG. 6, the electronic device 100 may display an execution screen of a messenger application. On the execution screen of the messenger application, a list of respective conversation rooms and messages that were most recently input in the conversation rooms may be included. However, the execution screen of the messenger application is merely an example, and the execution screen may be implemented in various ways according to the user setting or the setting of a server providing an application service.

On the execution screen of the messenger application, a message input window 610 wherein messages can be input into at least one conversation room among the entire conversation rooms may be included. That is, the message input window 610 is not an input window included in a specific conversation room, but it may refer, for example, to an input window wherein messages can be input into the entire conversation rooms or messages can be input into one conversation room among the entire conversation rooms.

The electronic device 100 may acquire the first scores, the second scores, and the fifth scores corresponding to the respective conversation rooms using the first model, the second model, and the third model based on the first sentence input into the message input window 610. Then, the electronic device 100 may sum up the first scores, the second scores, and the fifth scores, and acquire summed-up scores for the respective conversation rooms.

The electronic device 100 may identify the conversation room having the summed-up score of the biggest size as a conversation room corresponding to the first sentence. For example, as illustrated in (a) of FIG. 6, the summed-up score of the 'college alumni reunion' conversation room among the plurality of conversation rooms may be the highest value. The electronic device 100 may identify the 'college alumni reunion' as a conversation room corresponding to the first sentence, and input the first sentence into the 'college alumni reunion.'

As another example, as illustrated in (b) of FIG. 6, the electronic device 100 may provide a message 620 inquiring whether to input a sentence input into the message input window 610 into the conversation room having the biggest summed-up score. For example, if a user command for inputting the first sentence into the conversation room having the biggest summed-up score (e.g., the college alumni reunion conversation room) is input (e.g., touching 'yes'), the electronic device 100 may input the first sentence into the college alumni reunion conversation room.

According to an embodiment of the disclosure, the electronic device 100 may be implemented as an AI speaker. In the electronic device 100 implemented as an AI speaker, data related to the user account in the messenger application (e.g., the list of conversation rooms wherein the user is included in the message application and sentences input into the respective conversation rooms, etc.) may be stored.

If a user voice that a text is input into a conversation room generated through the messenger application is input, the electronic device 100 may input the user voice into the dialogue system and acquire a text corresponding to the user voice. Then, the electronic device 100 may acquire the first scores, the second scores, and the fifth scores corresponding to the respective conversation rooms using the first model, the second model, and the third model based on the acquired text.

The electronic device 100 may sum up the first scores, the second scores, and the fifth scores and acquire the summed-up scores for the respective conversation rooms. The electronic device 100 may identify the conversation room having the summed-up score of the biggest size as a conversation room corresponding to the acquired text.

As an example, the electronic device 100 may input the acquired text into the identified conversation room. As another example, the electronic device 100 may output a message inquiring whether to input the acquired text into the identified conversation room in the form of a voice. If a user voice ordering to input the text into the identified conversation room is input, the electronic device 100 may input the acquired text into the identified conversation room.

Figure 7:
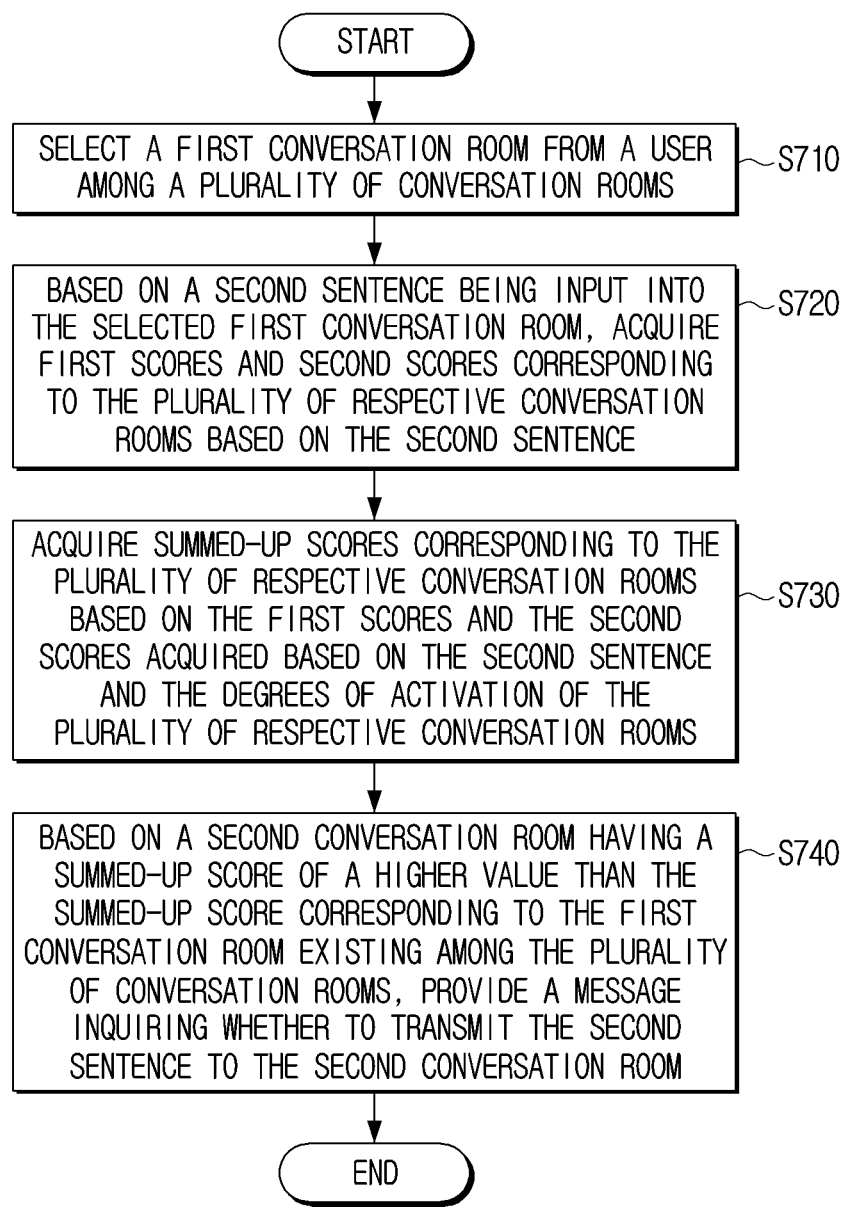
FIG. 7 is a flowchart illustrating an example process wherein an electronic device identifies whether a sentence input into a conversation room matches the characteristic of the conversation room according to various embodiments.
Figure 8:
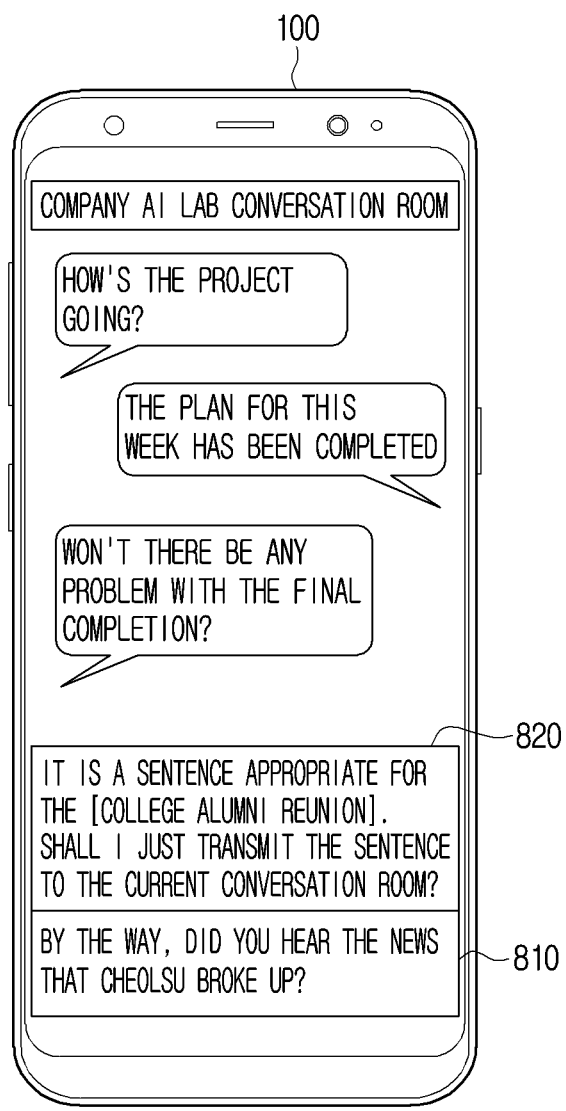
FIG. 8 is a diagram illustrating an example process wherein an electronic device provides a message to a user based on whether a sentence input into a conversation room matches the characteristic of the conversation room according to various embodiments.

FIG. 7 is a flowchart illustrating an example process wherein the electronic device 100 identifies whether a sentence input into a conversation room matches the characteristic of the conversation room according to various embodiments. FIG. 8 is a diagram illustrating an example of the process described in the flowchart in FIG. 7 according to various embodiments, and the implementation example illustrated in FIG. 8 will be described when describing each operation of the flowchart in FIG. 7.

The electronic device 100 may receive input of selection of the first conversation room from the user among the plurality of conversation rooms in operation S710. For example, the electronic device 100 may receive input of a user command selecting the 'company AI lab' conversation room among the plurality of conversation rooms illustrated in (a) of FIG. 6.

When a second sentence is input into the first conversation room selected by the user, the electronic device 100 may acquire the first scores and the second scores corresponding to the plurality of respective conversation rooms based on the second sentence in operation S720. For example, the electronic device 100 may acquire the first scores and the second scores corresponding to the plurality of respective conversation rooms using the first model, the second model, and the third model. As the process of acquiring the first scores and the second scores through each model was described above, overlapping explanation will be omitted.

For example, if the second sentence (e.g., 'By the way, did you hear the news that Cheolsu broke up?') is input into an input window 810 wherein messages can be input into the company AI lab conversation room selected by the user, the electronic device 100 may acquire the first scores and the second scores corresponding to the plurality of respective conversation rooms based on the second sentence.

The electronic device 100 may acquire the summed-up scores corresponding to the plurality of respective conversation rooms based on the first scores and the second scores acquired based on the second sentence and the degrees of activation of the plurality of respective conversation rooms in operation S730.

The summed-up scores may refer, for example, to scores wherein the first scores indicating the similarity between the scores corresponding to the formality levels and the topics of the plurality of respective conversation rooms and the score corresponding to the formality level and the topic of the second sentence, the second scores indicating the relevance between the sentences input into the plurality of conversation rooms and the second sentence, and the fifth scores indicating the degrees of activation of the plurality of respective conversation rooms are summed up.

In case a second conversation room having a summed-up score of a higher value than the summed-up score corresponding to the first conversation room exists among the plurality of conversation rooms, the electronic device 100 may provide a message inquiring whether to transmit the second sentence to the second conversation room in operation S740. For example, in case it is determined that the input second sentence is more appropriate for another conversation room that is not the conversation room selected by the user, the electronic device 100 may provide a message inquiring whether to input the second sentence into the conversation room determined to be more appropriate. The electronic device 100 may input the second sentence into the first conversation room or the second conversation room according to a user command corresponding to the message.

For example, in case the summed-up score corresponding to the college alumni reunion conversation room is higher than the summed-up score corresponding to the company AI lab conversation room based on the input second sentence, the electronic device 100 may provide a message 820 inquiring whether to input the second sentence into the college alumni reunion conversation room. The electronic device 100 may input the second sentence input into the input window 810 into the company AI lab conversation room or the college alumni reunion conversation room according to a user command corresponding to the message 820.

Figure 9:
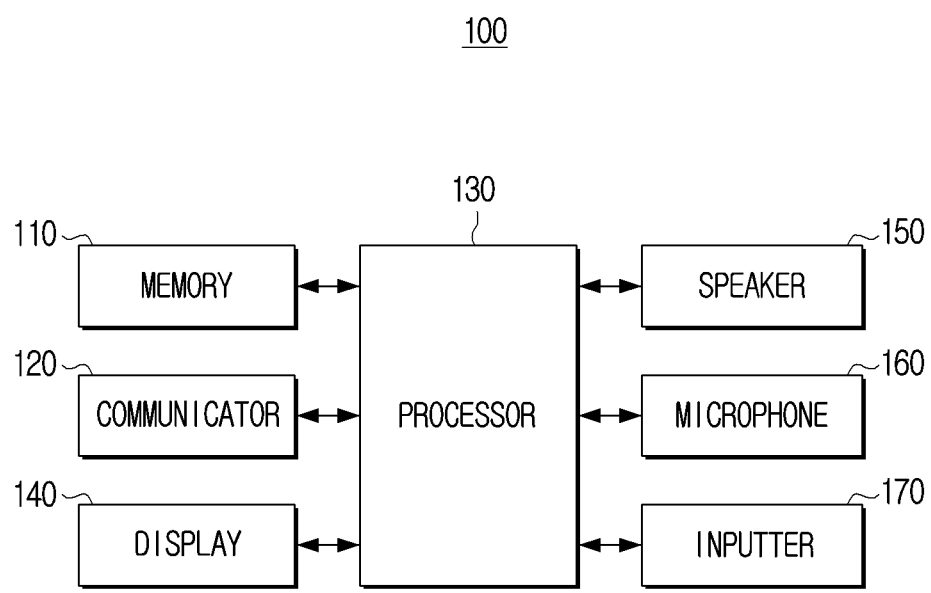
FIG. 9 is a block diagram illustrating an example configuration of an electronic device according to various embodiments.

FIG. 9 is a block diagram illustrating an example configuration of the electronic device 100 according to various embodiments. The electronic device 100 may include a memory 110, a communicator (e.g., including communication circuitry) 120, a processor (e.g., including processing circuitry) 130, a display 140, a speaker 150, a microphone 160, and an inputter (e.g., including input circuitry) 170. As the memory 110, the communicator 120, and the processor 130 were described in detail with reference to FIG. 1, overlapping explanation may not be repeated here.

The display 140 may display various information according to control of the processor 130. In particular, the display 140 may display an execution screen of a messenger application and sentences input by a user. On the execution screen of the messenger application, an input window displaying sentences input by a user may be included.

As another example, the display 140 may display a message that an input sentence will be input into one of the plurality of conversation rooms or that an input sentence is not appropriate for the conversation room selected by the user and is more appropriate for another conversation room to the user. As still another example, the display 140 may display an indicator indicating that an input sentence is not appropriate for the conversation room selected by the user.

The display 140 may be implemented as a touch screen together with a touch panel, and it may also be implemented as a flexible display.

The speaker 150 is a component that outputs not only various kinds of audio data for which various processing jobs such as decoding or amplification, noise filtering, etc. were performed by an audio processor, but also various kinds of notification sounds or voice messages.

The speaker 150 may output a message that an input sentence will be input into one of the plurality of conversation rooms or that an input sentence is not appropriate for the conversation room selected by the user and is more appropriate for another conversation room to the user in the form of a voice. As another example, the speaker 150 may output a notification sound indicating that an input sentence is not appropriate for the conversation room selected by the user.

The microphone 160 is a component that can receive input of a voice from a user. The microphone 160 may be provided inside the electronic device 100, but it may also be provided outside and electronically connected with the electronic device 100. Also, in case the microphone 160 is provided outside, the microphone 160 may transmit a user voice signal generated through a wired/wireless interface (e.g., Wi-Fi, Bluetooth) to the processor 130.

The microphone 160 may receive input of a user voice ordering to input a specific message into a conversation room. Here, the user voice may include a wake-up word (or, a trigger word) that can activate the dialogue system.

The inputter 170 may include a circuit, and receive a user input for controlling the electronic device 100. For example, the inputter 170 may include a touch panel for receiving input of a user touch using a user's hand or a stylus pen, etc., buttons for receiving input of a user manipulation, etc. As another example, the inputter 170 may be implemented as another input device (e.g., a keyboard, a mouse, a motion inputter, etc.). Meanwhile, the inputter 170 may receive input of a sentence from a user for inputting a message into a conversation room.

The drawings accompanying the disclosure are not for limiting the technology described in the disclosure to a specific embodiment, but they should be interpreted to include various modifications, equivalents, and/or alternatives of the embodiments of the disclosure. Also, with respect to the detailed description of the drawings, similar components may be designated by similar reference numerals.

In the disclosure, expressions such as "have," "may have," "include," and "may include" denote the existence of such characteristics (e.g.: elements such as numbers, functions, operations, and components), and do not exclude the existence of additional characteristics.

In the disclosure, the expressions "A or B," "at least one of A and/or B," or "one or more of A and/or B," and the like may include all possible combinations of the listed items. For example, "A or B," "at least one of A and B," or "at least one of A or B" may refer to all of the following cases: (1) including at least one A, (2) including at least one B, or (3) including at least one A and at least one B.

Further, the expressions "first," "second," and the like used in the disclosure may describe various elements regardless of any order and/or degree of importance. Such expressions are used simply to distinguish one element from another element, and are not intended to limit the elements.

The description in the disclosure that one element (e.g.: a first element) is "(operatively or communicatively) coupled with/to" or "connected to" another element (e.g., a second element) should be interpreted to include both the case where the one element is directly coupled to the another element, and the case where the one element is coupled to the another element through still another element (e.g., a third element). In contrast, the description that one element (e.g., a first element) is "directly coupled" or "directly connected" to another element (e.g., a second element) can be interpreted to mean that still another element (e.g., a third element) does not exist between the one element and the another element.

Also, the expression "configured to" used in the disclosure may be interchangeably used with other expressions such as "suitable for," "having the capacity to," "designed to," "adapted to," "made to," and "capable of," depending on cases. The term "configured to" does not necessarily refer, for example, to a device being "specifically designed to" in terms of hardware. Instead, under some circumstances, the expression "a device configured to" may refer, for example, to the device "being capable of" performing an operation together with another device or component. For example, the phrase "a sub-processor configured to perform A, B, and C" may refer, for example, to a dedicated processor (e.g., an embedded processor) for performing the corresponding operations, or a generic-purpose processor (e.g., a CPU or an application processor) that can perform the corresponding operations by executing one or more software programs stored in a memory device.

In addition, the various embodiments of the disclosure may be implemented as software including instructions stored in machine-readable storage media, which can be read by machines (e.g., computers). The machines refer to apparatuses that call instructions stored in a storage medium, and can operate according to the called instructions, and the apparatuses may include a server cloud according to the aforementioned embodiments. In case an instruction is executed by a processor, the processor may perform a function corresponding to the instruction by itself, or using other components under its control. An instruction may include a code that is generated by a compiler or executable by an interpreter. A storage medium that is readable by machines may be provided in the form of a non-transitory storage medium. The 'non-transitory' storage medium does not include signals, and is tangible, but does not indicate whether data is stored in the storage medium semi-permanently or temporarily. For example, 'a non-transitory storage medium' may include a buffer wherein data is temporarily stored.

Further, according to various example embodiments, the method according to the various embodiments described in the disclosure may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or may be distributed on-line through an application store (e.g, Play Store™). In the case of on-line distribution, at least a portion of a computer program product (e.g., a downloadable app) may be stored in a storage medium such as the server of the manufacturer, the server of the application store, and the memory of the relay server at least temporarily, or may be generated temporarily.

Each of the components according to the various embodiments (e.g., a module or a program) may include a singular object or a plurality of objects. In addition, among the aforementioned corresponding sub-components, some sub-components may be omitted, or other sub-components may be further included in the various embodiments. Alternatively or additionally, some components (e.g., a module or a program) may be integrated as an object, and perform the functions that were performed by each of the components before integration identically or in a similar manner Operations performed by a module, a program, or other components according to the various embodiments may be executed sequentially, in parallel, repetitively, or heuristically. Or, at least some of the operations may be executed in a different order or omitted, or other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device comprising:
a memory; and
at least one processor, individually and/or collectively configured to:
input, into a first model, sentences related to a plurality of conversation rooms generated through a messenger application and acquire characteristic information of conversations included in the plurality of respective conversation rooms,
based on a first sentence being an input of a user, input the first sentence and the characteristic information into a second model and acquire first scores indicating a similarity between the first sentence and the characteristics of the conversations included in the plurality of respective conversation rooms,
input the first sentence and the sentences related to the plurality of conversation rooms into a third model and acquire second scores indicating relevance between the sentences related to the plurality of conversation rooms and the first sentence,
identify a conversation room corresponding to the first sentence among the plurality of conversation rooms based on the characteristic information, the first scores, and the second scores, and
input the first sentence into the identified conversation room,
through a formality classification module in the first model, classify the formality levels of the conversations included in the plurality of respective conversation rooms, and acquire third scores indicating a formality of the conversations included in the plurality of respective conversation rooms based on the classified formality levels,
through a topic classification module in the first model, classify the topics of the conversations included in the plurality of respective conversation rooms into a plurality of categories, and acquire fourth scores corresponding to topics of the conversations included in the plurality of respective conversation rooms based on an amount of sentences corresponding to each of the plurality of classified categories in the conversations included in the plurality of respective conversation rooms,
through an activation classification module in the first model, acquire fifth scores indicating degrees of activation of the plurality of respective conversation rooms based on input frequencies of sentences of all users of the plurality of respective conversation rooms, and a frequency of inputting sentences into the plurality of respective conversation rooms,
through the second model, acquire a score corresponding to a formality level of the first sentence and a score corresponding to a topic of the first sentence, calculate first similarity between the acquired score corresponding to the formality level of the first sentence and third scores, and second similarity between the acquired score corresponding to the topic of the first sentence and the fourth scores and, and acquire the first scores corresponding to the plurality of respective conversation rooms based on the calculated first similarity and second similarity,
through the first model, classify the conversations included in the plurality of conversation rooms into a first conversation corresponding to an entire time, a second conversation corresponding to a specified time, and a third conversation including sentences input by the user, and
identify formality levels and topics corresponding to the respective first conversation, second conversation, and third conversation, and acquire the third scores and the fourth scores corresponding to the plurality of respective conversation rooms based on the identified formality levels and topics.

2. The electronic device of claim 1,
wherein the at least one processor is, individually and/or collectively configured to:
store a database wherein at least one sentence recently input for the plurality of respective conversation rooms are classified into respective topics based on degrees of activation of the plurality of respective conversation rooms in the memory, input sentences corresponding to a topic of the first sentence in the database and the first sentence into the third model and acquire scores indicating relevance between the sentences corresponding to the topic of the first sentence and the first sentence, and identify the highest scores for the respective conversation rooms among the acquired scores indicating the relevance between the sentences corresponding to the topic of the first sentence and the first sentence, and identify the identified highest scores for the respective conversation rooms as second scores corresponding to the plurality of respective conversation rooms.

3. The electronic device of claim 1, wherein the at least one processor is, individually and/or collectively configured to:

acquire summed scores by summing the first scores, the second scores, and fifth scores corresponding to each of the plurality of respective conversation rooms, the fifth scores indicating the degrees of activation of the plurality of respective conversation rooms in the characteristic information corresponding to the plurality of respective conversation rooms, and identify the conversation room having the highest summed score among the plurality of conversation rooms as the conversation room corresponding to the first sentence.

4. A method of operating an electronic device, the method comprising:

inputting, into a first model, sentences related to a plurality of conversation rooms generated through a messenger application and acquiring characteristic information of conversations included in the plurality of respective conversation rooms;

based on a first sentence being input by a user, inputting the first sentence and the characteristic information into a second model and acquiring first scores indicating a similarity between the first sentence and the characteristics of the conversations included in the plurality of respective conversation rooms;

inputting the first sentence and sentences related to the plurality of conversation rooms into a third model and acquiring second scores indicating relevance between the sentences input into the plurality of conversation rooms and the first sentence;

identifying a conversation room corresponding to the first sentence among the plurality of conversation rooms based on the characteristic information, the first scores, and the second scores; and inputting the first sentence into the identified conversation room;

wherein the acquiring the characteristic information comprises:

through a formality classification module in the first model, classifying the formality levels of the conversations included in the plurality of respective conversation rooms, and acquiring third scores indicating a formality of the conversations included in the plurality of respective conversation rooms based on the classified formality levels, through a topic classification module in the first model, classifying the topics of the conversations included in the plurality of respective conversation rooms into a plurality of categories, and acquiring fourth scores corresponding to topics of the conversations included in the plurality of respective conversation rooms based on an amount of sentences corresponding to each of the plurality of classified categories in the conversations included in the plurality of respective conversation rooms, through an activation classification module in the first model, acquiring fifth scores indicating degrees of activation of the plurality of respective conversation rooms based on input frequencies of sentences of all users of the plurality of respective conversation rooms, and a frequency of inputting sentences into the plurality of respective conversation rooms, through the second model, acquiring a score corresponding to a formality level of the first sentence and a score corresponding to a topic of the first sentence, calculating first similarity between the third scores the acquired score corresponding to the formality level of the first sentence and second similarity between the fourth scores and the acquired score corresponding to the topic of the first sentence, and acquiring the first scores corresponding to the plurality of respective conversation rooms based on the calculated first similarity and second similarity, wherein the acquiring characteristic information comprises:

through the first model, classifying the conversations included in the plurality of conversation rooms into a first conversation corresponding to an entire time, a second conversation corresponding to a specified time, and a third conversation including sentences input by the user; and identifying formality levels and topics corresponding to the respective first conversation, second conversation, and third conversation, and acquiring the third scores and the fourth scores corresponding to the plurality of respective conversation rooms based on the identified formality levels and topics.

* * * * *